(12) United States Patent
Holmes

(10) Patent No.: US 6,484,102 B1
(45) Date of Patent: Nov. 19, 2002

(54) SYSTEM FOR EVALUATING FLUID DISTRIBUTIONS OF SUBSURFACE RESERVOIRS

(75) Inventor: Michael Holmes, Boulder, CO (US)

(73) Assignee: Digital Formation Inc., Denver, CO (US)

( * ) Notice: Subject to any disclaimer, the term of this patent is extended or adjusted under 35 U.S.C. 154(b) by 46 days.

(21) Appl. No.: 09/645,725

(22) Filed: Aug. 24, 2000

(51) Int. Cl.$^7$ ................................................. G01V 3/18
(52) U.S. Cl. ......................................................... 702/6
(58) Field of Search .............................. 702/6, 7, 8, 12, 702/13; 324/303, 324, 325

(56) References Cited

U.S. PATENT DOCUMENTS

| | | | |
|---|---|---|---|
| 3,643,738 A | | 2/1972 | Dreher et al. |
| 4,506,548 A | * | 3/1985 | Zemanek, Jr. ................ 702/13 |
| 4,903,207 A | | 2/1990 | Alger et al. |
| 5,621,169 A | | 4/1997 | Harris et al. |
| 6,021,662 A | | 2/2000 | Moulu et al. |

OTHER PUBLICATIONS

Abbas Firoozabadi and Henry J. Ramey, Jr.; Surface tension of water–hydrocarbon systems at reservoir conditions; Journal of Canadian Petroleum Technology; May–Jun., 1988; p. 41–48; vol. 27; No. 3.

Christopher Skelt and Bob Harrison; An Integrated Approach to Saturation Height Analysis; SPWLA 36$^{th}$ Annual Logging Symposium; Jun. 26–29, 1995; p. 1–10.

R. P. Alger, D. L. Luffeland R. B. Truman; New Unified Method of Integrating Core Capillary Pressure Data With Well Logs; SPE Formation Evaluation; Jun., 1989; p. 145–152.

Tim T. Schowalter; Mechanics of Secondary Hydrocarbon Migration and Entrapment; AAPG Bulletin; May, 1979; p. 723–760; vol. 63; No. 5.

Edward D. Pittman; Relationship of Porosity and Permeability to Various Parameters Derived from Mercury Injection–Capillary Pressure Curves for Sandstone; AAPG Bulletin; Feb., 1992; p. 191–198; vol. 76; No. 2.

B. F. Swanson; A Simple Correlation Between Permeabilities and Mercury Capillary Pressures; Journal of Petroleum Technology; Dec., 1981; p. 2498–2504.

Ben F. Swanson; A Simple Correction Between Air Permeabilities and Stressed Brine Permeabilities with Mercury Capillary Pressures; Society of Petroleum Engineers of AIME; 53$^{rd}$ Annual Fall Technical Conference and Exhibition; Oct., 1978; 10 pages (p. 1–4 and 6 pages of figures).

J. H. M. Thomeer; Introduction of a Pore Geometrical Factor Defined by the Capillary Pressure Curve; Journal of Petroleum Technology; Technical Note 2057; Mar., 1960; p. 73–77.

(List continued on next page.)

*Primary Examiner*—Donald E. McElheny, Jr.
(74) *Attorney, Agent, or Firm*—E. Eugene Thigpen

(57) ABSTRACT

In one embodiment the invention comprises a method for generating a log of a subsurface formation, in which data from well logging measurements are utilized to derive a relationship between porosity and irreducible water saturation for the formation and the derived relationship between porosity and irreducible water saturation is applied to a porosity log of the subsurface formation to generate a log of irreducible water saturation. In another embodiment the invention comprises a method for calculating a theoretical water saturation log for a subsurface formation which utilizes a relationship based on porosity, irreducible water saturation and height above the petroleum-water contact level.

19 Claims, 8 Drawing Sheets

OTHER PUBLICATIONS

Joseph M. Hawkins, Donald L. Luffel and Thomal G. Harris; Capillary pressure model predicts distance to gas/water, oil/water; Oil & Gas Journal; Jan. 18, 1993; p. 39–43.

Brochure; ResTech; Identify Limits & Quantify Reserves; Mar., 1995; one page; vol. 1; Issue 3.

Brochure; ResTech; With no other well data, how can we find this reservoir's water lever?; Apr., 1995; one page; vol. 1; Issue 4.

Brochure; ResTech; Are you shortchanging your reserve estimates because of shoulder and thin bed effects on the induction log?; May, 1995; one page; vol. 1; Issue 5.

Brochure; ResTech; Synthetic Capillary pressure curves provide an independent method for calculating oil–in–place; Jun., 1995; one page; vol. 1; Issue 6.

Michael Holmes and Douglas B. Tipple and H. K. Van Poollen and Associates, Inc.; Comparisons Between Log and Capillary Pressure Data To Estimate Reservoir Wetting; Society of Petroleum Engineer of AIME; $52^{nd}$ Annual Fall Technial Conference and Exhibition of the Society of Petroleum Engineer of AIME held in Denver Colorado; Oct. 9–12, 1977; p. 1–14 and 8 pages of figures.

J. J. Pickell and B. F. Swanson and W. B. Hickman; Application of Air–Mercury and Oil–Capillary Pressure Data In the Study of Pore Structure and Fluid Distribution; Society of Petroleum Engineers Journal; Mar., 1966; p. 33–34 and p. 57–61.

Dan Smith; How to predict down–dip water level; World Oil; May 1992; vol. 213; No. 5; p. 85–88.

* cited by examiner

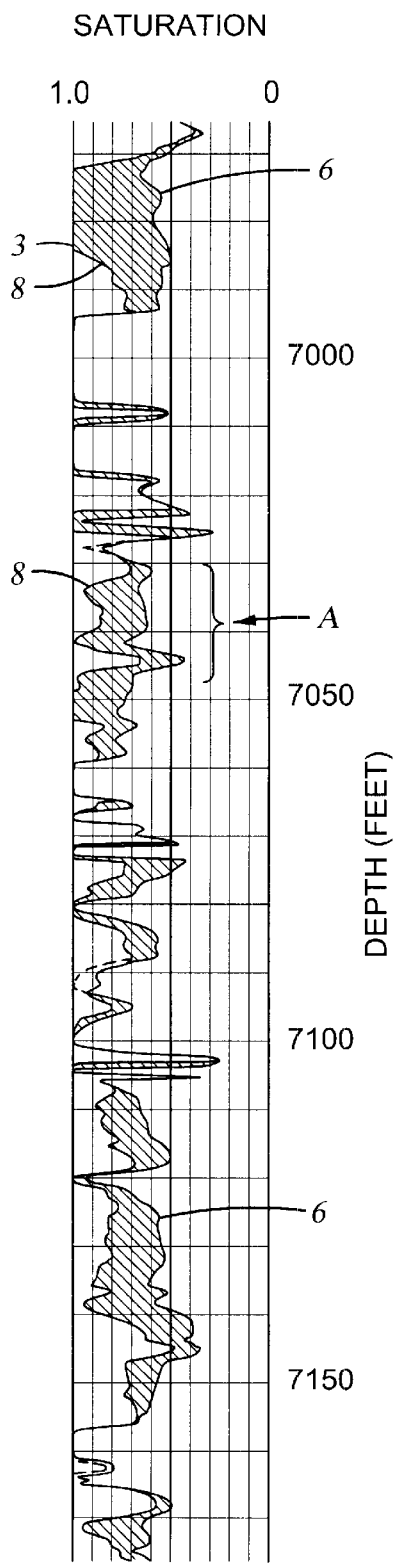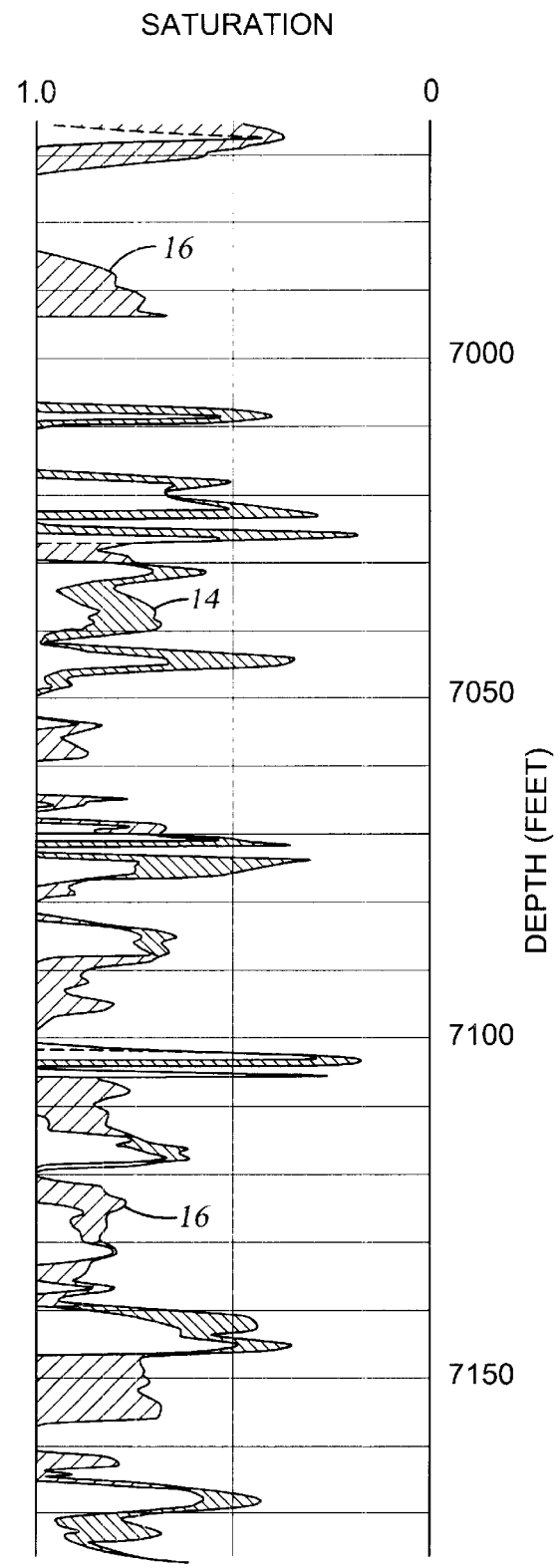
*Fig. 3A*          *Fig. 7A*

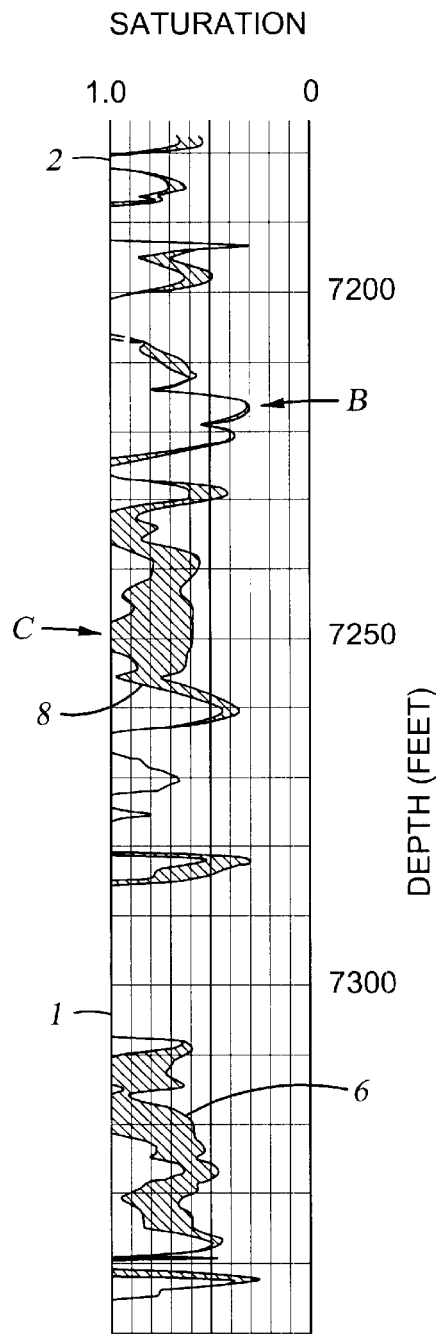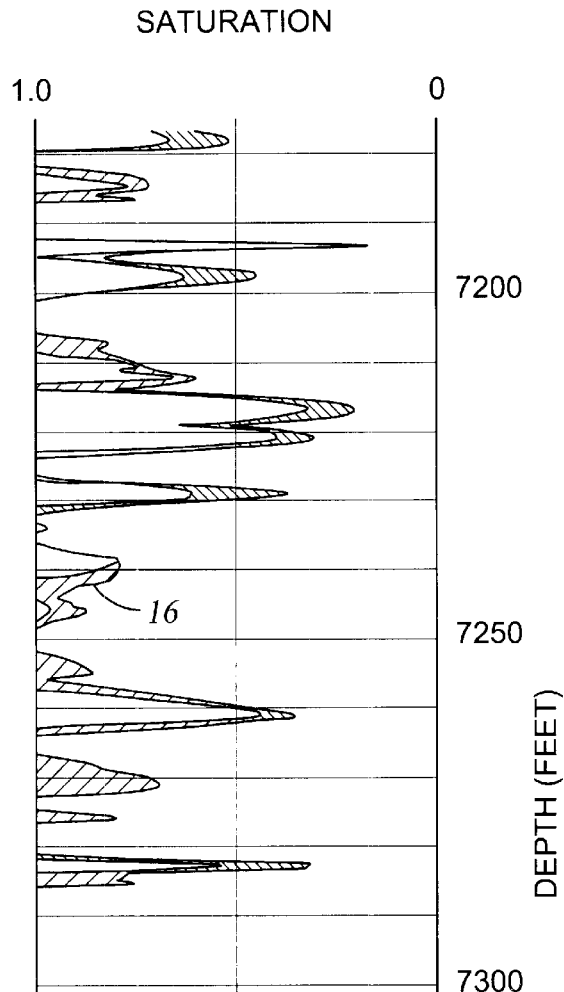
Fig. 3B
Fig. 7B

SYSTEM FOR EVALUATING FLUID DISTRIBUTIONS OF SUBSURFACE RESERVOIRS

BACKGROUND OF THE INVENTION

1. Field of the Invention

The invention relates to the field of oil and gas exploration and development and, more particularly, to a system for more accurately assessing the fluid distribution of subsurface reservoirs.

2. Background

Subterranean reservoirs of natural gas and petroleum, hereinafter referred to generically as "hydrocarbons", are typically found trapped in permeable geological strata beneath a layer of impermeable strata material. Normally ground water, typically referred to as "connate" water, will be present in the reservoir along with the hydrocarbon. Because hydrocarbons are lighter than water, the hydrocarbons will accumulate toward the top of a reservoir and water will occupy the bottom portion of the reservoir. Typically, a transition zone will exist between the two fluids. In some regions, impermeable layers may be relatively closely stacked atop one another, trapping numerous zones of what may be hydrocarbons, water or a combination of water and hydrocarbons between impermeable layers. A wellbore penetrating a subsurface formation may penetrate a plurality of zones containing hydrocarbons and/or water. The estimation of water saturation vs. hydrocarbon saturation in these zones, and the estimation of which of these zones are hydraulically connected aids in the estimation of the amount of hydrocarbons in place and volumes of hydrocarbons which may be recovered, and in the selection of completion intervals.

Large sums are expended in performing well logging and in obtaining cores from wells and in examining these well logs and cores, in order to evaluate reservoir characteristics. Various methods have also been developed for analyzing reservoir characteristics.

The article by Christopher and Bob Harrison, An Integrated Approach to Saturation Height Analysis, from the SPWLA 36$^{th}$ Annual Logging Symposium, Jun. 26–29, 1995, discussed hydrocarbon distributions within the reservoir in terms of the saturation height function. The article states that the general form of the function relating hydrocarbon saturation $S_h$ to height above free water level h is:

$$S_h = 1 - S_\omega = a\exp\left(\frac{-b}{h+d}\right)^c, \quad \text{(Eq. 1)}$$

and for capillary pressure PC measurements the equivalent expression is:

$$S_h = 1 - S_\omega = a\exp\left(\frac{-b}{P_c+d}\right)^c. \quad \text{(Eq. 2)}$$

The article further states that $S_\omega$ is water saturation and, depending on the context, a, b, c, and d are constants, or alternatively they may be simple function of rock properties such as permeability. The article also states that a formulation is presented so that each term in the function can be related directly to a physical parameter such as irreducible water saturation, ratio of contact angle and surface tension between laboratory and reservoir conditions, threshold capillarity entry pressure, and height differences between free water level and oil water contact.

The Technical Note, Introduction of a Pore Geometrical Factor Defined by the Capillary Pressure Curve, Journal of Petroleum Technology, March, 1960, p. 73–77, by J. H. M. Thomeer, provides a mathematical description of capillary pressure curves. The technique is said to be based on the observation that the location and shape of a capillary pressure curve reflect characteristics of the pore structure of the sample. It is stated that regarding the location and shape of a capillary pressure curve in which core saturation is plotted as a function of pressure: "The location of the curve with respect to the $(V_b)_{P_c}$ and $P_c$ axes is a measure of the interconnected pore volume and of the cross-sectional area of the pore first entered by mercury, respectively. The shape of the curve depends on the interconnection of the pores and the sorting of the pore size." $P_c$ is stated to be the mercury/air capillary pressure psia, and $(V_b)_{P_c}$ the fractional bulk volume occupied by mercury at Pressure $P_c$. It is noted that: "Some capillary pressure curves show two plateaus at different pressures. These so called "double curves" may be expected when capillary pressure curves are run, for example, on vuggy limestone samples or samples composed of sand silt laminations. . . . Physical rock properties depending primarily on the relatively larger pores of a sample are expected to be related to the parameters of the lower pressure curve. For example, the contribution to permeability by the relatively finer pores is often negligible compared to that of the relatively larger pores. An example of a double curve is shown in FIG. 5."

The article Comparison Between Log and Capillary Pressure Data to Estimate Reservoir Wetting, SPE 6856, 1977, by Michael Holmes and Douglas B. Tippie, presents a method whereby comparison of capillary pressure measurements with logs can be used to estimate in-situ wetting. The article includes a discussion of the conversion of capillary pressure at reservoir conditions into an equivalent height above the oil-water contact.

U.S. Pat. No. 5,621,169, which issued on Apr. 15, 1997 to Harris et al., discloses a method for predicting the hydrocarbon/water contact level for oil and gas wells which relates porosity $\Phi$, water saturation $S_\omega$, air permeability $k_a$ and capillary pressure $P_c$. The hydrocarbon/water contact levels are predicted through regression analysis using porosity $\Phi$, water saturation $S_\omega$, air permeability $k_a$ from well log and core analysis information. The articles by Joseph M. Hawkins, Donald L. Luffel and Thomas G Harris, Capillary pressure model predicts distance to gas/water, oil/water contact, Oil and Gas Journal, Jan. 18, 1993, pp 38–43; and by R. P. Alger, D. L. Luffel and R. B. Truman, New Unified Method of Integrating Core Capillary Pressure Data With Well Logs, SPE, June, 1989, p. 145–152, provide further discussion of the method discussed in U.S. Pat. No. 5,621,169.

U.S. Pat. No. 4,903,207, which issued on Feb. 20, 1990 to Alger et al., discloses, for a formation zone of a well, a method for determining the relationship between bulk volume of oil as a function of total effective formation porosity and height above the oil water contact from capillary pressure data of a core taken from the formation of the well. It is stated that it is one object of the invention to provide a method for determination of height h above the oil-water contact of a reservoir at a particular depth d (and consequently the water level WL=d+h) where no wells with open-hole logs have been drilled deep enough to penetrate and locate the depth of the oil-water contact, but capillary pressure data are available from analysis of cores taken from at least one well.

A long felt and continuing need continues to exist, however, for a system for more accurately assessing the fluid distribution of subsurface reservoirs.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

In one embodiment the invention comprises a method for generating a log of a subsurface formation, in which data from well logging measurements are utilized to derive a relationship between porosity and irreducible water saturation for the formation and the derived relationship between porosity and irreducible water saturation is applied to a porosity log of the subsurface formation to generate a log of irreducible water saturation.

In another embodiment the invention comprises a method for calculating a theoretical water saturation log for a subsurface formation which utilizes a relationship based on porosity, irreducible water saturation and height above the petroleum-water contact level. In one implementation of the invention the relationship is:

$$(\text{Height})(S_{\omega theor} - S_{\omega i}) = P_{CHYPMOVED} \quad \text{(Eq. 3)}$$

wherein Height is the height in a hydraulic unit above the petroleum-water contact level, $S_{\omega theor}$ is the calculated water saturation, $S_{\omega i}$ is irreducible water saturation, and $P_{CHYPMOVED}$ is related to porosity.

BRIEF DESCRIPTION OF THE DRAWINGS

The present invention may be understood by reference to the following detailed description taken in conjunction with the drawings briefly described below.

FIG. 3A and FIG. 3B show the irreducible water saturation log plotted against the petrophysically calculated water saturation log.

FIGS. 7A and 7B show a comparison of the calculated value of $S_{\omega theor}$ to the petrophysically derived values for $S_\omega$.

While the invention will be described in connection with its preferred embodiments, it will be understood that the invention is not limited thereto, but shall include all alternatives, modifications, and equivalents within the scope of the appended claims.

DESCRIPTION OF A PREFERRED EMBODIMENT

A wellbore penetrating a subsurface formation may penetrate a plurality of zones which contain hydrocarbons and/or water. Many of these zones will be hydraulically isolated from any other of the zones. However, some of the zones may be hydraulically interconnected such that a plurality of the zones are linked in a single hydraulic unit. It is well known that in a subsurface hydraulic unit (which may be referred to herein as a "reservoir") containing both water (or brine) and a hydrocarbon (which may be crude oil or natural gas), the fluid at the top of a reservoir may be mostly hydrocarbons. Below the reservoir region which is mostly saturated with hydrocarbons is a transition zone containing both brine and hydrocarbons, which may have a depth extending from a few centimeters up to thousands of meters. Normally, below the reservoir region containing the brine-hydrocarbon mixture is a region which is 100% brine saturated.

Figure 1:
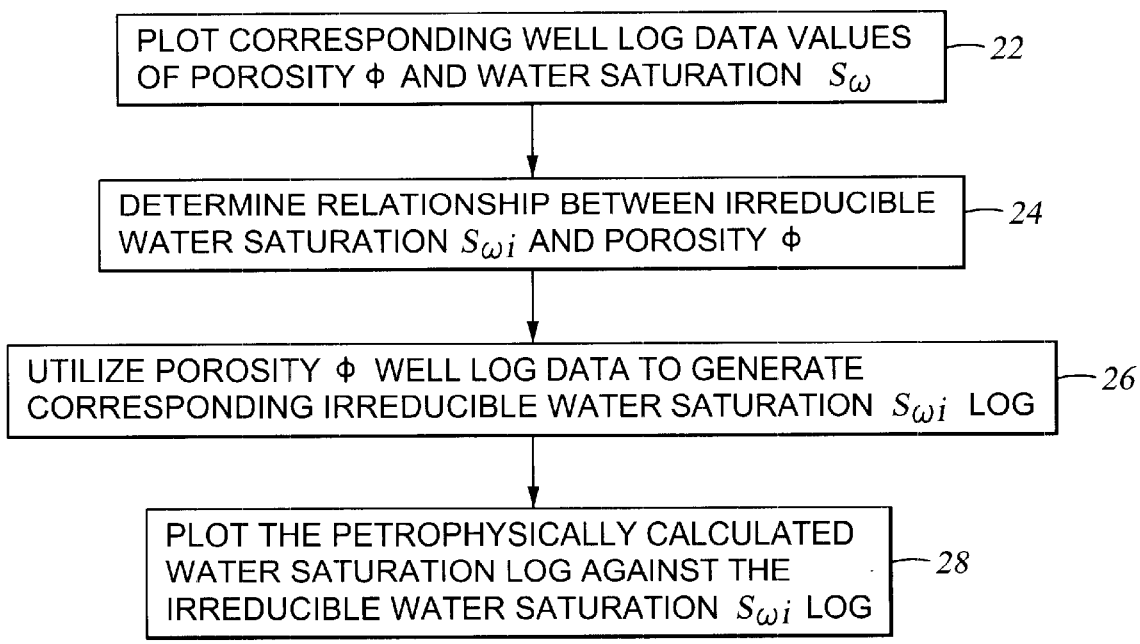
FIG. 1 is an outline of an embodiment of the invention.

In one embodiment of the invention, as outlined in steps 22, 24 and 26 of FIG. 1, a log of irreducible water saturation $S_{\omega i}$ is generated for a formation of interest. In a further embodiment of the invention, in step 28 of FIG. 1, the log of irreducible water saturation $S_{\omega i}$ is displayed in relation to a log of water saturation $S_\omega$ for the formation, calculated with the well known Archie's Equation. This display is useful in identifying separate hydraulic units in a subsurface formation. "Archie's Equation" is:

$$S_\omega^n = \frac{aR_\omega}{\Phi^m R_T} \quad \text{(Eq. 4)}$$

where: $\Phi$=porosity $R_\omega$=resistivity of formation water $R_T$=resistivity of formation rock measured with well log n=saturation exponent m=cementation exponent.

Logs of $\Phi$, $R_\omega$ and $R_T$ are routinely generated during well logging. For convenience, the water saturation calculated with the Archie's Equation will be referred to hereafter as the "petrophysically calculated" water saturation.

Figure 2:
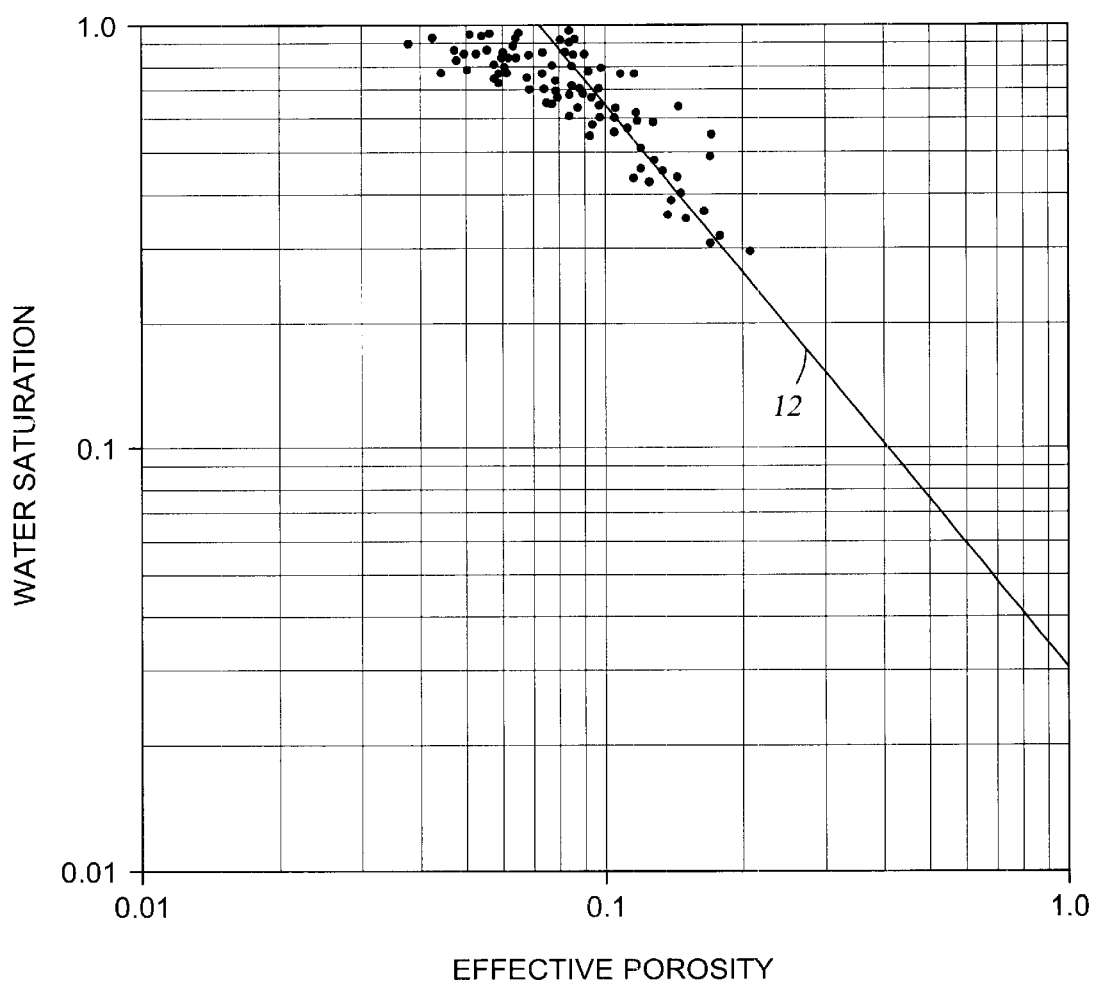
FIG. 2 shows a typical plot of the log of $S_\omega$ (water saturation) versus the log of porosity ($\Phi$), for a formation.

In one implementation of the invention, to generate the irreducible water saturation $S_{\omega i}$ log for the well, the logarithms of a plurality of corresponding values, derived from well logs, of porosity ($\Phi$) and water saturation $S_\omega$ from various depths in the well are plotted on a grid, as indicated in step 22 of FIG. 1, with the logarithm of porosity plotted on the abscissa and the logarithm of water saturation plotted on the ordinate. When the term "porosity" is used herein, the term is intended to mean the "effective porosity", which is the porosity available to free fluids, excluding unconnected porosity and space occupied by bound water and disseminated shale FIG. 2 shows a plot of the log of $S_\omega$ (water saturation) versus the log of porosity ($\Phi$), for selected data points from a formation. Such a plot will typically show a line of data points, extending diagonally in a direction from upper left toward lower right, which substantially follow a line such as the line designated by numeral 12 in FIG. 2. It is generally recognized that such data points represent measurements made at well locations where the water saturation is at the irreducible water saturation level. Although not included in FIG. 2, such a plot of data points may also show data points at other locations, including a cluster of data points toward the upper right hand corner, from well locations at which the water saturation is greater than the irreducible water saturation. The relationship between porosity $\Phi$ and irreducible water saturation $S_{\omega i}$ described by line 12 can be written as:

$$(\Phi^b)(S_{\omega i}) = d, \quad \text{(Eq. 5)}$$

where b is an exponent, and d is a constant.

The exponent "b" is the slope of the line 12. Typically, the value of the exponent will be between 1.0 and 1.8. The value of the constant, d, is the value of $S_\omega$ at which an extrapolation of the line 12 reaches a porosity value equal to 1. Typically, the value of the constant, d, varies from 0.01 to 0.10. Typically, each reservoir will have different values of "b" and "d". In step 24 of FIG. 1, the relationship between porosity and irreducible water saturation from Equation 4 is determined, and is then applied in step 26 to the porosity log for the formation of interest in order to generate an irreducible water saturation log for the formation. For the relationship between $\Phi$ and $S_{\omega i}$, defined by line 12 in FIG. 2, Eq. 5 becomes:

$$(\Phi^{1.19})(S_{\omega i})=0.043. \qquad (Eq. 6)$$

Often, a plurality of distinct lines will appear in such a plot of porosity vs. water saturation, with each line representing a different zone within a formation. If a plurality of distinct lines appear in a plot such as shown in FIG. 2, rather than a single line such as the line designated by the numeral 12, the reservoir zones represented by each of the lines may need to be treated separately.

In step 28 of FIG. 1, the petrophysically calculated log of water saturation $S_\omega$, calculated with Archie's Equation, is plotted against the irreducible water saturation log. An example of such a plot is shown in FIG. 3A and FIG. 3B, in which well depths extend from about 6970 feet to about 7350 feet. In FIG. 3A and FIG. 3B, the irreducible water saturation log is indicated by numeral 6 and the petrophysically calculated log of water saturation $S_\omega$ is indicated by numeral 8. In FIG. 3A and FIG. 3B, the grey areas represent areas of mobile water, where $S_\omega$ is greater than $S_{\omega i}$. At depths where the petrophysically calculated water saturation is substantially equal to the irreducible water saturation the two logs are substantially superimposed on each other.

At reservoir intervals which are substantially 100% water saturated, the petrophysically calculated value of water saturation may be substantially equal to 1.0 (100%), and there will be substantial divergence between the petrophysically calculated water saturation log and the irreducible water saturation log. At well locations in a hydrocarbon/water transition zone of a reservoir, the profile for $S_\omega$ will gradually converge toward the profile for $S_{\omega i}$ (such as at location A in FIG. 3A), and at well locations where the water saturation of a reservoir is at the irreducible water saturation level, the petrophysically calculated water saturation log and the irreducible water saturation log will superimpose (such as at location B in FIG. 3B).

The petrophysically calculated value of water saturation will also be greater than the irreducible water saturation value if a reservoir is "wet"; that is, if the reservoir contains no significant hydrocarbons. In such reservoirs the petrophysically calculated value of water saturation may be substantially equal to 1.0(100%) throughout the reservoir. Such a reservoir is indicated at location C in FIG. 3B.

Normally the top and bottom of the hydraulic zones will be defined by an impermeable shale layer. The location of these shale layers can normally be estimated from well log data.

If the well has penetrated only one hydrocarbon accumulation, there will normally be a single pattern of gradual convergence upwards of the petrophysically calculated water saturation profile and the irreducible water saturation profile. However, if there is more than one accumulation, the two profiles will show a series of convergences and divergences, each of which may indicate a different hydraulic zone. Each level, in FIG. 3A and FIG. 3B, at which the petrophysically calculated water saturation profile is at substantially 1.0(100%) and above which level the petrophysically calculated profile gradually converges toward the $S_{\omega i}$ profile represents a potential petroleum/water contact level, and the vertical distance above each potential water contact level represents an estimated height above the petroleum/water contact level.

Figure 4:
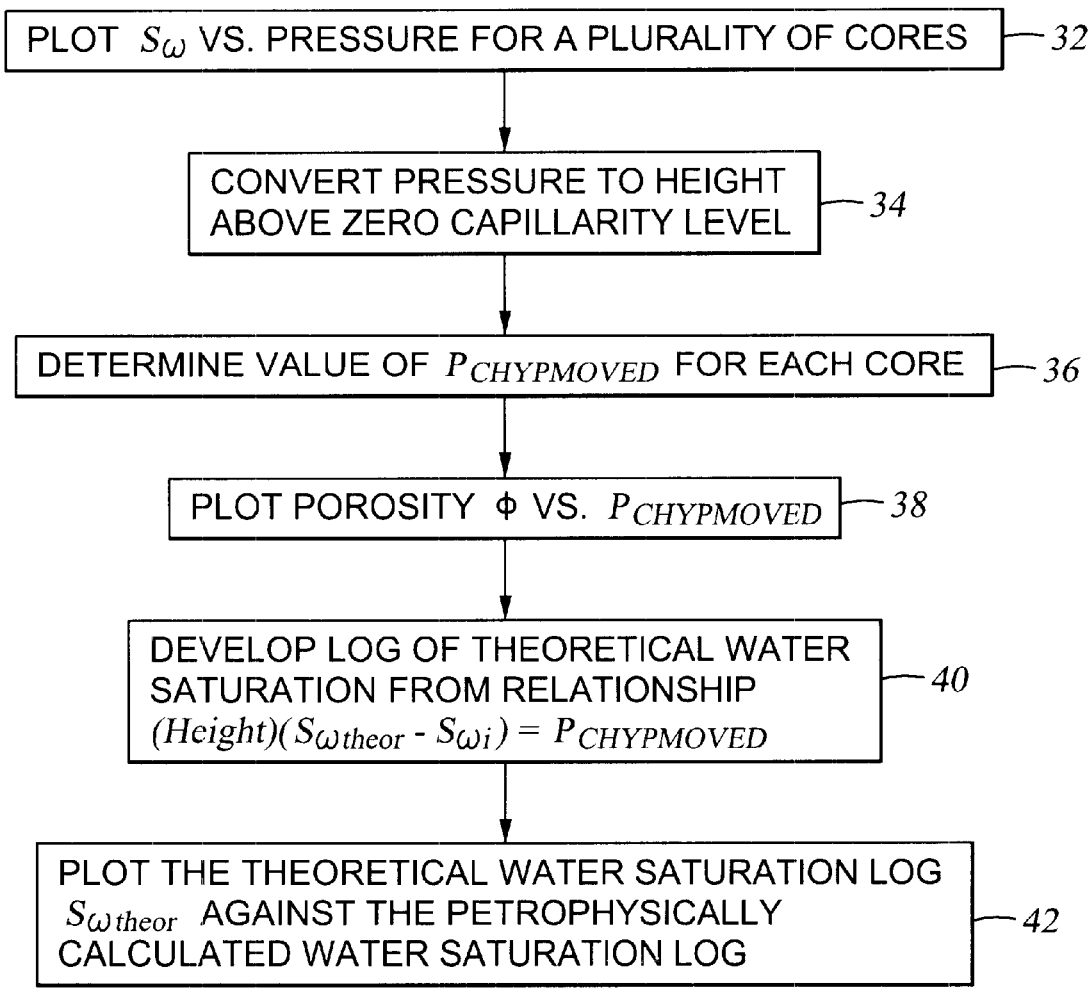
FIG. 4 is an outline of another embodiment of the invention.

In another embodiment of the invention, outlined in FIG. 4, a log of theoretical values of water saturation ($S_{\omega theor}$) is generated, based on log-measured porosity values, the height above the zero capillarity level (Height) and irreducible water saturation ($S_{\omega i}$) values, and this theoretical water saturation log is compared to the petrophysically derived log of water saturation (computed with Archie's Equation) to check for anomalies. Irreducible water saturation ($S_{\omega i}$) values may be computed as described above. For purposes of practicing the present invention, the zero (0) capillarity level may be assumed to be substantially at the petroleum/water contact level and Height (the height above zero capillarity level) may be estimated from a comparison of the calculated $S_{\omega i}$ log and the petrophysically derived log of water saturation, such as shown in FIG. 3A and FIG. 3B.

In practicing this embodiment of the invention, data derived from a plurality of cores from the subsurface formation of interest, or cores having characteristics of the subsurface formation of interest, are utilized. Typically, these cores will be one inch long with a diameter of 0.75 inch, although other core sizes would be of equal utility. To derive such core data, laboratory measurements are made for each core, utilizing methods well known to those of ordinary skill in the art, of fluid saturation versus the magnitude of pressure applied across opposite faces of the core. Typically, measurements are made using either of three measurement techniques: mercury injection, centrifuge, or the semipermeable membrane method. In the mercury injection method, a core is initially saturated with air and pressure is applied to inject mercury into the core and displace the air. The air saturation (or the mercury saturation) is then measured as a function of applied pressure. In the centrifuge method, the core is initially saturated with water or brine, and pressure is applied to the core by means of a centrifuge. As the water is displaced by air, the residual water saturation is measured as a function of applied pressure. In the semipermeable membrane method, the core is initially saturated with water, a membrane is applied to a surface of the core, and water is displaced by synthetic oil. As the pressure is increased, oil and water saturation is measured as a function of applied pressure.

Figure 5A:
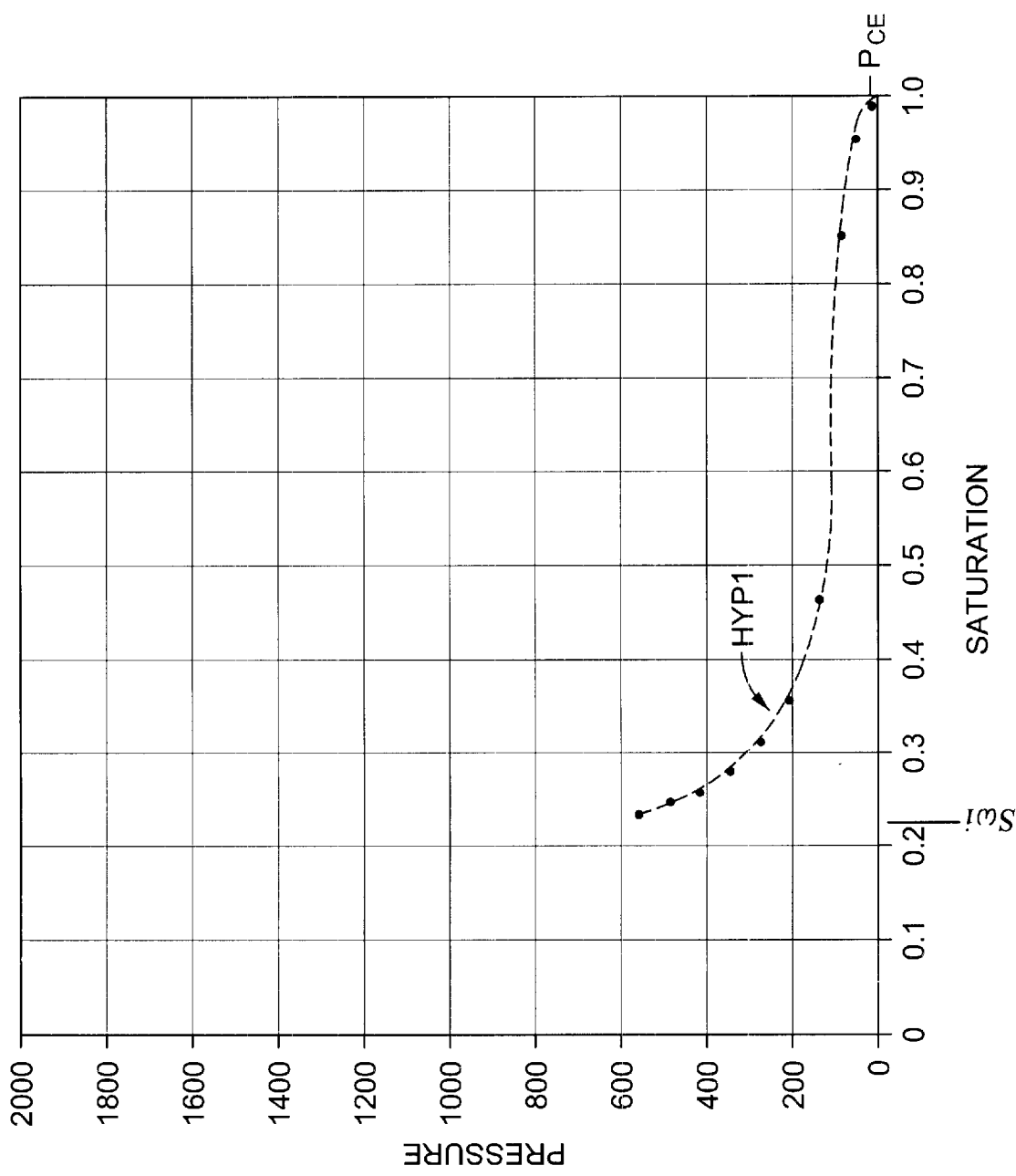
FIG. 5A shows a typical change in water saturation as a function of pressure as measured in a laboratory.

As indicated in step 32 of FIG. 4, a plot is made of water saturation vs. pressure for a plurality of cores. A typical graph showing change in water saturation as a function of pressure is shown in FIG. 5A. For a core which is initially water saturated, because of capillarity a certain minimum amount of pressure must be applied across the core before the water begins to flow from the core, thereby reducing the saturation. This minimum pressure level will be referred to herein as the core entry pressure level ($P_{CE}$) Some water will remain in the core even at very high pressures. This residual saturation level is normally referred to as the "irreducible water saturation level". A graph of the change in water saturation as a function of pressure is substantially in the form of a hyperbola in which water saturation asymptotically approaches the irreducible water saturation level as pressure increases, and asymptotically approaches $P_{CE}$ as the saturation increases.

For many cores, at very high pressures, there is a further reduction of the water saturation from the "irreducible water saturation level" $S_{\omega i}$. Tests have indicated that this further reduction in water saturation occurs in most cores, and that the graph of this further change in water saturation with increasing pressure forms a second distinct hyperbola. However, for conditions found in actual reservoirs it can be assumed that the minimum water saturation will be at substantially the $S_{\omega i}$ level, and this second hyperbola is not shown in FIG. 5A. The first of these hyperbolas, for which the value of water saturation asymptotically approaches the level of $S_{\omega i}$ (irreducible water saturation), is denoted on FIG. 5A and referred to herein as HYP1. The second hyperbola, for which the value of water saturation asymptotically approaches a value which may be referred to as $S_{\omega min}$ may be referred to as HYP2. Typically, the value of $S_{\omega min}$ is about 80% of the value of $S_{\omega i}$. Typical values for $P_{CE}$, $S_{\omega i}$, $S_{\omega min}$, HYP1, HYP2 and porosity are:

$P_{CE}$=5 pounds per square inch $S_{\omega i}$=0.25

$S_{\omega min}$=0.20

HYP1=0.2

HYP2=10.0

Porosity=30 percent

Figure 5B:
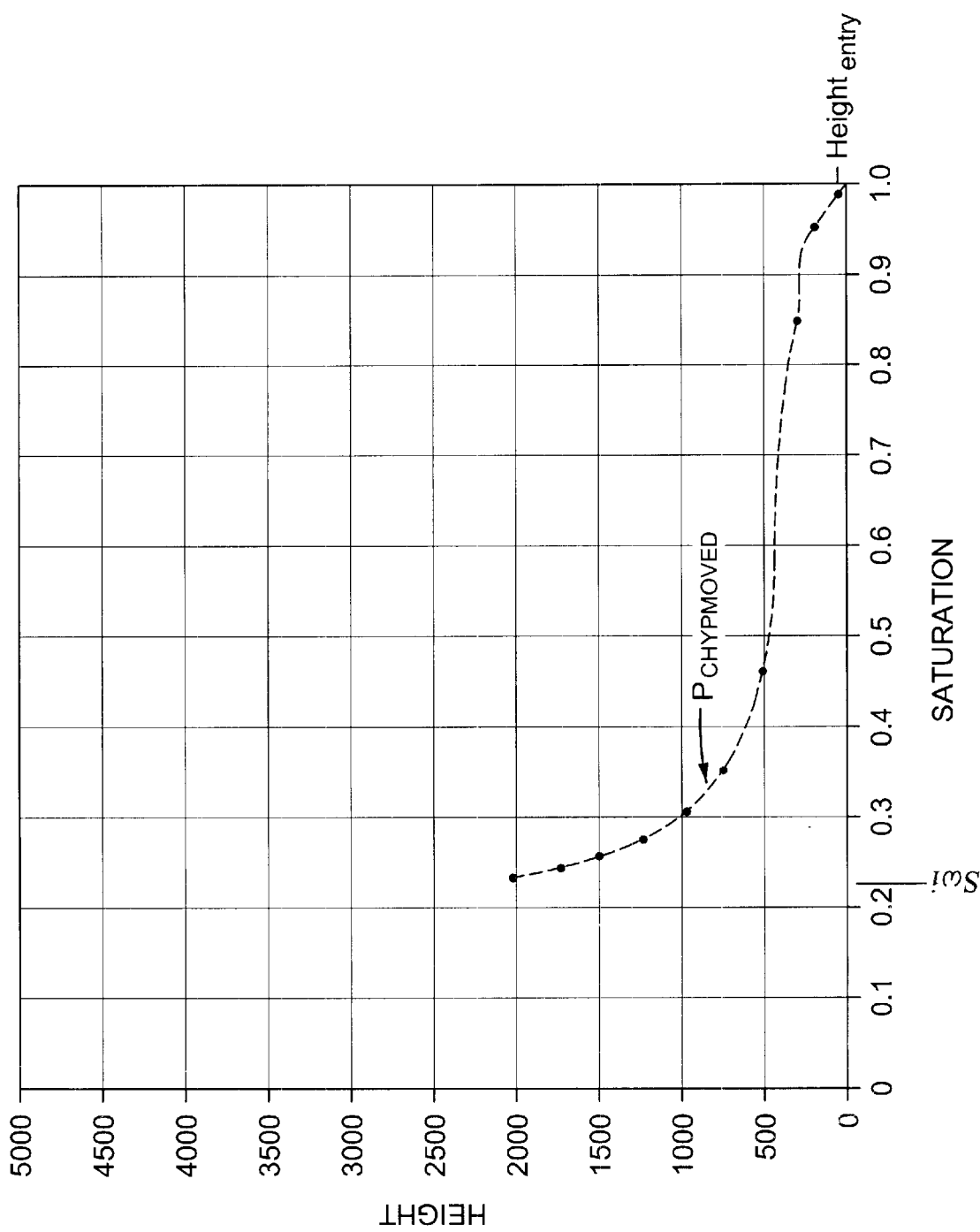
FIG. 5B shows the same data displayed in FIG. 5A, but with pressure applied in the laboratory, $P_{CL}$, converted to Height, the height above zero capillarity level.

As indicated in step 34 of FIG. 4, the core measurements discussed with reference to FIG. 5A are preferably converted to equivalent measurements representing conditions of a subsurface reservoir, as shown in FIG. 5B, to facilitate practicing the invention. In a hydrocarbon-containing reservoir, because of buoyancy, oil and natural gas accumulate towards the top of the reservoir. Both natural gas and crude oil will be lighter than the brine, so the buoyancy of the hydrocarbons exerts a force which forces brine from the pore space in the same manner as the applied pressure forces the saturating fluids from the cores in the laboratory. In the lower region of the reservoir, where the pressure exerted by the hydrocarbons is less than the pore entry pressure $P_{CE}$ as shown in FIG. 5A, the water saturation will be substantially 100%. The height in the reservoir at which pressure exerted by the hydrocarbon buoyancy is equivalent to the pore entry pressure $P_{CE}$, at which hydrocarbons begin to enter the pore space of a core, will be referred to herein as Height$_{entry}$. The level (below the Height$_{entry}$ level) at which the capillary pressure resulting from the hydrocarbon buoyancy is substantially zero will be referred to as the zero (0) capillarity level. The pressure magnitude measured in the laboratory, in pounds per square inch, as displayed in FIG. 5A, may be converted to reservoir height above zero (0) capillarity level by utilizing the following formula:

$$H = \frac{P_{CL} \cdot \frac{(T\cos\Theta)_R}{(T\cos\Theta)_L}}{\rho_\omega - \rho_h}, \quad \text{(Eq. 8)}$$

in which

H=the height in feet above the free water level corresponding to zero capillary pressure $P_{CL}$=capillary pressure in the laboratory in pounds per square inch $(T \cos \Theta)_R$=interfacial tension times the cosine of the contact angle (initial reservoir conditions)

$(T \cos \Theta)_L$=interfacial tension times the cosine of the contact angle (laboratory conditions)

$\rho_\omega$=water gradient in pounds per square inch per foot at initial reservoir conditions $\rho_h$=hydrocarbon gradient in pounds per square inch per foot at initial reservoir conditions.

If values of $\cos\omega$ are not known precisely, it may be assumed that the value is equal to one (1) for both reservoir and laboratory conditions. The value for interfacial tension for the laboratory conditions will be known, because the fluids being used to perform the measurements will be known. The value for interfacial tension may be known for the reservoir fluids, but if the value is not known, it may be assumed that the interfacial tension of oil and water is about 31. If the hydrocarbon in the reservoir is oil, the API gravity of the oil may be measured or estimated, and the value $\rho_h$ may be calculated from a standard equation known to those of ordinary skill in the art. If the reservoir fluid is gas, the density of the gas varies less than the density of oil, and the value of $\rho_h$ for gas can normally be estimated by methods known to those of ordinary skill in the art.

FIG. 5B shows the same data displayed in FIG. 5A, but with pressure applied in the laboratory, $P_{CL}$, converted to Height, the height above zero (0) capillarity level. The hyperbola section designated in FIG. 5B as $P_{CHYPMOVED}$ corresponds to HYP1 in FIG. 5A.

The formula for a hyperbola has the form:

$$xy=\text{constant} \quad \text{(Eq. 9)}$$

Accordingly, the hyperbola $P_{CHYPMOVED}$ may be approximated by the following expression:

$$(\text{Height}-\text{Height}_{entry})(S_\omega-S_{\omega i})=P_{CHYPMOVED} \quad \text{(Eq. 10)}$$

where Height=the height above zero (0) capillarity level; and

Height$_{entry}$=the height of the petroleum/water contact level above the zero (0) capillarity level.

Because the value of Height$_{entry}$ is small, Eq. 9 may be simplified to the following form without significantly reducing the accuracy of the results:

$$(\text{Height})(S_\omega-S_{\omega i})=P_{CHYPMOVED} \quad \text{(Eq. 11)}$$

The value of $P_{CHYPMOVED}$ may be determined graphically for each core, as indicated in step 36 of FIG. 4.

Figure 6:
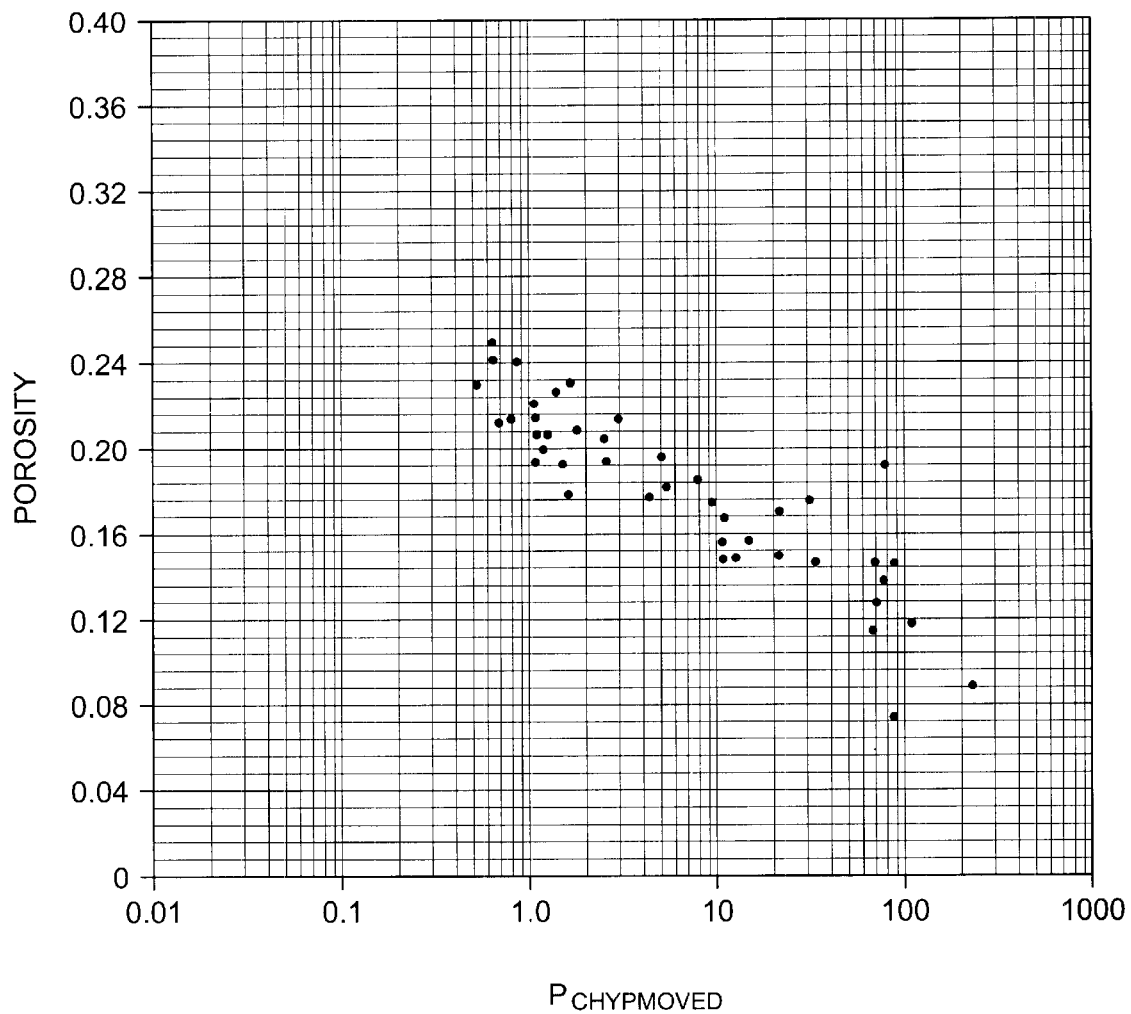
FIG. 6 shows a typical plot of porosity vs. log $P_{CHYPMOVED}$ for a collection of cores from the same subsurface formation.

I have determined that the value of $P_{CHYPMOVED}$ for a core is related to the porosity of the core, and that porosity varies linearly as a function of the logarithm of $P_{CHYPMOVED}$. In step 38 of FIG. 4, a plot is generated of porosity vs. $P_{CHYPMOVED}$. FIG. 6 shows a typical plot of porosity vs. log $P_{CHYPMOVED}$ for a collection of cores from the same subsurface formation. The value of $P_{CHYPMOVED}$ is determined by first developing the saturation vs. pressure curve, as described with reference to FIG. 5A, for a plurality of cores, then converting the pressure values to the corresponding Height (height above zero capillarity) as described with reference to FIG. 5B. For each of the cores, the value of $P_{CHYPMOVED}$ can be approximated from the locations of the hyperbola defined by the Height vs Saturation data points. The value of porosity ($\Phi$) vs. the value of $P_{CHYPMOVED}$ for each of the cores is then plotted on a grid such as shown in FIG. 6 in which porosity is plotted on a linear scale and $P_{CHYPMOVED}$ is plotted on a log scale. Although the data points evidence a degree of randomness, nevertheless, they substantially track a straight line, and if the porosity is known for any location on a well log, an approximation of the value of $P_{CHYPMOVED}$ may be derived for that location from the graphical relationship between porosity and $P_{CHYPMOVED}$. It is understood that different reservoirs will exhibit different correlations of porosity with $P_{CHYPMOVED}$. Data are now available for developing a log of theoretical water saturation, based on porosity, the height above the zero capillarity level and the irreducible water saturation value, utilizing the relationship of Eq. 11. For clarity, however, the value of $S_\omega$, calculated with Eq. 11, will now be referred to as $S_{\omega theor}$, so that Eq. 11 becomes:

$$(\text{Height})(S_{\omega theor} - S_{\omega i}) = P_{CHYPMOVED} \quad \text{(Eq. 3)}$$

The $P_{CHYPMOVED}$ values corresponding to the measured porosity log, the $S_{\omega i}$ log previously developed, and the Height estimations developed from the plot of petrophysically calculated $S_\omega$ vs. the calculated $S_{\omega i}$ are utilized for calculating $S_{\omega theor}$. This step is indicated as step 40 of FIG. 4.

The computation of $S_{\omega theor}$ will typically begin at the base of the well, in the lowest hydraulic unit. The value of porosity at each depth level is based on well log data. The value of $S_{\omega theor}$ is now calculated for the entire hydraulic unit.

The estimation of the zero (0) capillarity level is repeated for each hydraulic zone and the steps for calculating water saturation $S_{\omega theor}$ are repeated for all hydraulic units extending through the subsurface formation of interest. In step 42 of FIG. 4, a log of the calculated water saturation $S_{\omega theor}$ is plotted against petrophysically derived values of water saturation, calculated with Archie's Equation. If values for the calculated $S_{\omega theor}$ are offset from the petrophysically derived values for $S_\omega$, it may be that the zero capillarity level estimate was incorrect. The zero capillarity level may then be modified until a "best fit" is achieved of the plots of calculated $S_{\omega theor}$ and the petrophysically derived values for $S_\omega$. FIG. 7A and FIG. 7B show a portion of such a log, for the same well and the same well depths as shown in FIG. 3A and FIG. 3B, of the calculated water saturation $S_{\omega theor}$ plotted against petrophysically derived values of water saturation. The $S_{\omega theor}$ log is designated by numeral 14 and the log of the petrophysically derived values of water saturation is designated by numeral 16. Locations at which the data indicate the presence of a petroleum/water contact levels are designated by numerals 1 and 2 in FIG. 7B, and by numeral 3 in FIG. 7A.

Accurate determination of the petroleum/water contact level has great value. For example, it may be determined that the petroleum/water contact level for a hydraulic unit is at a lower level than the lowest level of the hydraulic unit penetrated by the well, and that the recoverable reserves from a reservoir are, accordingly, greater than could be determined from conventional well logging data.

In FIG. 7A and FIG. 7B, at well locations where the petrophysically calculated values for $S_\omega$ are substantially greater than the calculated $S_{\omega theor}$ values, the difference is shown in solid grey. At well locations in FIG. 7A and FIG. 7B where the petrophysically calculated values for $S_\omega$ are substantially less than the calculated $S_{\omega theor}$ values, the difference is shown with diagonal cross-hatch lines. For regions where there is close agreement between the calculated $S_{\omega theor}$ and the petrophysically derived values for $S_\omega$, confirmation is provided of the accuracy of the petrophysical calculation, which utilizes the Archie Equation. If there is a discrepancy between the calculated $S_{\omega theor}$ and the petrophysically derived values for $S_\omega$, the discrepancy indicates that a reevaluation of the reservoir model may be warranted. For example, discrepancies between the calculated $S_{\omega theor}$ and the petrophysically derived values for $S_\omega$, may indicate the presence of a previously unsuspected rock type change. Discrepancies may also indicate a problem with the data utilized in the petrophysical calculation.

An important use of the present invention is the ability to determine the petroleum-water contact interface level (zero capillarity level) for each hydraulic zone. Notwithstanding that a plurality of hydraulic zones on a well log may be separated by an impermeable barrier, if the petroleum-water contact level is calculated to be the same for a plurality of different hydraulic zones, that provides strong evidence that all of these hydraulic zones are interconnected into a single hydraulic unit.

Those of ordinary skill in the art will recognize that the steps of this invention will normally be implemented on a digital computer, and the computer instructions readable by a digital computer and defining the method of the invention will be stored on a storage medium such as magnetic tape, a magnetic or optical disk or an equivalent storage device and will instruct the computer to perform the method.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

I claim:

1. A method for generating a log of a subsurface formation, comprising:

obtaining corresponding values of porosity and water saturation for locations in said subsurface formation;

establishing a relationship between porosity and irreducible water saturation level for said formation by utilizing the general relationship $$(\Phi^b)(S_{\omega i}) = d$$

in which $\Phi$=porosity, $S_{\omega i}$=irreducible water saturation, b is an exponent and is set equal to the slope of a straight line fitted to data points of a plot of said corresponding values of porosity versus said corresponding values of water saturation, said corresponding values of porosity and water saturation each being plotted on a logarithmic scale, and d is a constant and is set equal to the value of water saturation at which an extrapolation of said straight line reaches a porosity value equal to 1 on said plot of said corresponding values of porosity versus said corresponding values of water saturation; and applying said established relationship between porosity and irreducible water saturation to a porosity log of said subsurface formation to generate a log of irreducible water saturation.

2. A method for generating a log of a subsurface formation, comprising:

obtaining corresponding values of porosity and water saturation for locations in said subsurface formation;

establishing a relationship between porosity and irreducible water saturation for said formation by utilizing the general relationship $$(\Phi^b)(S_{\omega i}) = d$$

in which $\Phi$=porosity, $S_{\omega i}$=irreducible water saturation, b is an exponent and is set equal to the slope of a straight line fitted to data points of a plot of said corresponding values of porosity versus said corresponding values of water saturation, said corresponding values of porosity and water saturation each being plotted on a logarithmic scale, and d is a constant and is set equal to the value of water saturation at which an extrapolation of said straight line reaches a porosity value equal to 1 on said plot of said corresponding values of porosity versus said corresponding values of water saturation;

applying said established relationship to a porosity log of said subsurface formation to generate an irreducible water saturation log for said subsurface formation; and generating a saturation comparison log comparing said irreducible water saturation log with a log of water saturation calculated from petrophysical well logging data.

3. A method for estimating the locations in a subsurface formation where mobile water is present, comprising:

obtaining corresponding values of porosity and water saturation for locations in said subsurface formation;

establishing a relationship between porosity and irreducible water saturation for said formation by utilizing the general relationship $$(\Phi^b)(S_{\omega i}) = d$$

in which $\Phi$=porosity, $S_{\omega i}$=irreducible water saturation, b is an exponent and is set equal to the slope of a straight line fitted to data points of a plot of said corresponding values of porosity versus said corresponding values of water saturation, said corresponding values of porosity and water saturation each being plotted on a logarithmic scale, and d is a constant and is set equal to the value of water saturation at which an extrapolation of said straight line reaches a porosity value equal to 1 on said plot of said corresponding values of porosity versus said corresponding values of water saturation;

b is an exponent and is set equal to the slope of said straight line through said plotted porosity and water saturation values, and d is a constant and is set equal to the value of $S_\omega$ at which an extrapolation of said straight line reaches a porosity value equal to 1;

applying said established relationship to a porosity log of said subsurface formation to generate an irreducible water saturation log for said subsurface formation;

generating a saturation comparison log comparing said irreducible water saturation log with a log of water saturation calculated from petrophysical well logging data; and evaluating said saturation comparison log to identify levels at which water saturation calculated from petrophysical well logging data is greater than the irreducible water saturation level, thereby indicating the presence of mobile water.

4. The method of claim 3 wherein locations where the irreducible water saturation log and the log of water saturation calculated from well logging data begin to converge are identified to estimate the locations of petroleum-water contact levels.

5. A method for calculating a theoretical water saturation log for a subsurface formation, comprising:

utilizing a relationship based on porosity, irreducible water saturation and height above the petroleum-water contact level of hydraulic units to calculate said theoretical water saturation profile.

6. The method of claim 5 wherein said relationship is $$(\text{Height})(S_{\omega theor} - S_{\omega i}) = P_{CHYPMOVED}$$

wherein $S_{\omega theor}$ is the theoretical water saturation,

Height is the height in a hydraulic unit above the petroleum-water contact level, $S_{\omega i}$ is irreducible water saturation, and $P_{CHYPMOVED}$ is a function related to porosity.

7. The method of claim 6 wherein the relationship of $P_{CHYPMOVED}$ to porosity is determined by a method further comprising:

for each of a plurality of cores which are representative of a subsurface formation of interest, developing a relationship between water saturation of said core and pressure applied to said core in terms of height in a subsurface formation above zero capillarity level, said relationship being substantially in the form of a hyperbola defined by $$(\text{Height} - \text{Height}_{entry})(S_\omega - S_{\omega i}) = P_{CHYPMOVED}, \text{ wherein}$$

Height=height above zero capillarity level $\text{Height}_{entry}$=height above zero capillarity level at which water is initially forced from the core $S_\omega$=the water saturation level $S_{\omega i}$ the irreducible water saturation level;

obtaining the porosity value for each of said cores; and establishing said relationship between $P_{CHYPMOVED}$ and porosity for said cores.

8. The method of claim 7 wherein values of irreducible water saturation $S_{\omega i}$ are determined by a method, comprising:

utilizing data from well logging measurements to derive a relationship between porosity and irreducible water saturation for said formation, and applying said relationship between porosity and irreducible water saturation to a porosity log of said subsurface formation to generate said log of irreducible water saturation.

9. The method of claim 7 wherein Height is estimated by comparing the irreducible water saturation log with a log of water saturation calculated from petrophysical well logging data.

10. A method of generating a log of a subsurface formation, comprising:

utilizing a relationship based on porosity, irreducible water saturation and height above the petroleum-water contact level of hydraulic units to calculate a theoretical water saturation log for said subsurface formation; and generating a saturation comparison log comparing said theoretical water saturation to water saturation calculated from petrophysical well logging data.

11. A method for estimating characteristics of a subsurface formation, comprising:

utilizing a relationship based on porosity, irreducible water saturation and height above the petroleum-water contact level of hydraulic units to calculate a theoretical water saturation log for said subsurface formation; and generating a saturation comparison log comparing said theoretical water saturation to water saturation calculated from petrophysical well logging data; and evaluating said comparison log for locations where said theoretical water saturation and said water saturation calculated from petrophysical well logging data are in substantial agreement, thereby confirming the petrophysical well logging data and for locations where there are substantial differences between the theoretical water saturation and the water saturation calculated from petrophysical well logging data.

12. The method of claim 11 further comprising evaluating said comparison log for locations where said theoretical water saturation and said water saturation calculated from petrophysical well logging data are substantially different and modifying an estimate of petroleum-water contact level and recalculating at least a portion of said theoretical water saturation log.

13. The method of claim 11 further comprising evaluating said comparison log to identify hydraulic zones for which the petroleum-water contact level is substantially the same, thereby indicating that said identified hydraulic zones are parts of a common hydraulic unit.

14. The method of claim 11 wherein said locations in said comparison log where there are substantial differences between the theoretical water saturation and the water saturation calculated from petrophysical well logging data are further evaluated to estimate regions where there is a rock type change.

15. The method of claim 11 wherein said locations in said comparison log where there are substantial differences between the theoretical water saturation and the water saturation calculated from petrophysical well logging data are further evaluated to estimate regions where the petrophysical data are incorrect.

16. A device adapted for use by a digital computer wherein a plurality of computer instructions readable by said digital computer are encoded, which instructions instruct the computer to perform a process comprising:

obtaining corresponding values of porosity and water saturation for locations in said subsurface formation;

establishing a relationship between porosity and irreducible water saturation level for a subsurface formation by utilizing the general relationship $$(\Phi^b)(S_{\omega i}) = d$$

in which $\Phi$=porosity, $S_{\omega i}$=irreducible water saturation, b is an exponent and is set equal to the slope of a straight line fitted to data points of a plot of said corresponding values of porosity versus said corresponding values of water saturation, said corresponding values of porosity and water saturation each being plotted on a logarithmic scale, and d is a constant and is set equal to the value of water saturation at which an extrapolation of said straight line reaches a porosity value equal to 1 on said plot of said corresponding values of porosity versus said corresponding values of water saturation; and applying said relationship between porosity and irreducible water saturation to a porosity log of said subsurface formation to generate a log of irreducible water saturation for said subsurface formation.

17. A device adapted for use by a digital computer wherein a plurality of computer instructions readable by said digital computer are encoded, which instructions instruct the computer to perform a process comprising:

obtaining corresponding values of porosity and water saturation for locations in said subsurface formation;

establishing a relationship between porosity and irreducible water saturation for said subsurface formation by utilizing the general relationship $$(\Phi^b)(S_{\omega i}) = d$$

in which $\Phi$=porosity, $S_{\omega i}$=irreducible water saturation, b is an exponent and is set equal to the slope of a straight line fitted to data points of a plot of said corresponding values of porosity versus said corresponding values of water saturation, said corresponding values of porosity and water saturation each being plotted on a logarithmic scale, and d is a constant and is set equal to the value of water saturation at which an extrapolation of said straight line reaches a porosity value equal to 1 on said plot of said corresponding values of porosity versus said corresponding values of water saturation, to generate an irreducible water saturation log for said subsurface formation; and generating a saturation comparison log comparing said irreducible water saturation log with a log of water saturation calculated from petrophysical well logging data from said subsurface formation.

18. A device adapted for use by a digital computer wherein a plurality of computer instructions readable by said digital computer are encoded, which instructions instruct the computer to perform a process comprising:

utilizing a relationship based on porosity, irreducible water saturation and height above the petroleum-water contact level of hydraulic units to calculate a theoretical water saturation profile for a subsurface formation.

19. A device adapted for use by a digital computer wherein a plurality of computer instructions readable by said digital computer are encoded, which instructions instruct the computer to perform a process comprising:

utilizing a relationship based on porosity, irreducible water saturation and height above the petroleum-water contact level of hydraulic units to calculate a theoretical water saturation log for a subsurface formation; and generating a saturation comparison log comparing said theoretical water saturation to water saturation calculated from petrophysical well logging data from said subsurface formation.

\* \* \* \* \*